United States Patent
Herzel et al.

(10) Patent No.: US 10,760,669 B2
(45) Date of Patent: Sep. 1, 2020

(54) MACHINE OR VEHICLE COMPONENT

(71) Applicant: ElringKlinger AG, Dettingen (DE)

(72) Inventors: Matthias Herzel, Trochtelfingen (DE); Tobias Michael Gruhler, Pfullingen (DE); Peter Laichinger, Laichingen (DE)

(73) Assignee: ElringKlinger AG, Dettingen (DE)

( * ) Notice: Subject to any disclaimer, the term of this patent is extended or adjusted under 35 U.S.C. 154(b) by 983 days.

(21) Appl. No.: 14/490,320

(22) Filed: Sep. 18, 2014

(65) Prior Publication Data

US 2015/0000462 A1 Jan. 1, 2015

Related U.S. Application Data

(63) Continuation of application No. PCT/EP2013/054470, filed on Mar. 6, 2013.

(30) Foreign Application Priority Data

Mar. 22, 2012 (DE) .................. 10 2012 102 470

(51) Int. Cl.
*F16H 57/029* (2012.01)
*F16H 57/02* (2012.01)
*F02F 7/00* (2006.01)

(52) U.S. Cl.
CPC .......... *F16H 57/029* (2013.01); *F02F 7/006* (2013.01); *F16H 57/02* (2013.01); *Y10T 74/2186* (2015.01)

(58) Field of Classification Search
CPC ....... F02F 7/006; F02F 7/0068; F16H 57/031; F16H 57/029; F16H 57/02
See application file for complete search history.

(56) References Cited

U.S. PATENT DOCUMENTS 4,732,519 A * 3/1988 Wagner ................ F16B 5/0258
  403/14
5,513,603 A * 5/1996 Ang ....................... F02B 77/00
  123/198 E (Continued)

FOREIGN PATENT DOCUMENTS

DE      44 45 917 C1     12/1995
DE     195 07 960 C1      4/1996

(Continued)

OTHER PUBLICATIONS

EPO Translation of the Description of EP 1884629 A1, Lucas et al., Feb. 6, 2008.*

*Primary Examiner* — Daniel D Yabut
(74) *Attorney, Agent, or Firm* — Reinhart Boerner Van Deuren P.C.

(57) ABSTRACT

In a machine or vehicle component comprising a first housing part, a second housing part covering the first housing part, an opening which is provided in the second housing part, a functional attachment unit incorporating a mounting element consisting of a structurally rigid material which extends through the opening, it is proposed that the problem that the functional attachment unit can only be mounted on the second housing part if the structural rigidity thereof is sufficient to hold the functional attachment unit permanently in a stable position be solved in that the second housing part is formed from a thermoplastic material of low structural rigidity and in that there is provided a carrier which incorporates a carrying element consisting of a structurally rigid material and is fixed relative to the first housing part and upon which the attachment unit is held by means of the mounting element.

16 Claims, 10 Drawing Sheets

(56) References Cited

U.S. PATENT DOCUMENTS

| | | | |
|---|---|---|---|
| 5,699,770 A | | 12/1997 | Matsumoto et al. |
| 6,591,801 B1 * | | 7/2003 | Fonville ................ F02F 7/006 |
| | | | 123/195 C |
| 7,121,243 B2 * | | 10/2006 | Yoshijima ................ F01L 1/34 |
| | | | 123/90.38 |
| 8,590,499 B2 * | | 11/2013 | Ilgeroth ................ F01L 1/053 |
| | | | 123/193.5 |
| 2003/0150436 A1 | | 8/2003 | Stegmaier et al. |
| 2009/0235892 A1 * | | 9/2009 | Sumiya ................ F02F 7/006 |
| | | | 123/195 C |
| 2011/0180963 A1 | | 7/2011 | Kuno et al. |

FOREIGN PATENT DOCUMENTS

| | | | | |
|---|---|---|---|---|
| DE | 196 46 920 A1 | | 5/1997 | |
| DE | 101 27 819 A1 | | 1/2003 | |
| DE | 603 00 487 T2 | | 9/2005 | |
| DE | 10 2006 009 209 A1 | | 3/2007 | |
| DE | 602 16 991 T2 | | 5/2007 | |
| DE | 20 2006 011 672 U1 | | 1/2008 | |
| EP | 1170515 A2 * | | 1/2002 | ............ F02B 75/22 |
| EP | 1 233 155 A1 | | 8/2002 | |
| EP | 1 338 783 A2 | | 8/2003 | |
| EP | 1 338 786 A1 | | 8/2003 | |
| EP | 1 835 162 A1 | | 9/2007 | |
| EP | 1884629 A1 * | | 2/2008 | ............ F01L 1/344 |
| FR | 2 891 588 A1 | | 4/2007 | |
| FR | 2 895 459 A1 | | 6/2007 | |
| JP | 2008-163837 A | | 7/2008 | |

\* cited by examiner

MACHINE OR VEHICLE COMPONENT

CROSS REFERENCE TO RELATED PATENT APPLICATION

This application is a continuation of international application No. PCT/EP2013/054470 filed on Mar. 6, 2013.

This patent application claims the benefit of international application No. PCT/EP2013/054470 of Mar. 6, 2013 and German application number 10 2012 102 470.7 of Mar. 22, 2012, the teachings and disclosure of which are hereby incorporated in their entirety by reference thereto.

BACKGROUND OF THE INVENTION

The invention relates to a machine or vehicle component comprising a first housing part, a second housing part covering the first housing part, an opening which is provided in the second housing part and a functional attachment unit having a mounting element consisting of a structurally rigid material which extends through the opening.

Machine or vehicle components of this type are known from the state of the art.

For example, machine or vehicle components of this type are internal combustion engines, wherein the first housing part is comprised by the engine block and the second housing part represents a cover for the engine block particularly in the region of the valves.

However, the machine or vehicle component may be another drive or operating component, for example, a gear unit etc.

In machine or vehicle components of this type, the functional attachment unit cooperates with the machine or vehicle component by means of control and/or drive and/or drive functions for example.

The attachment unit which extends through the second housing part in the region of the opening can, for example, be an adjusting unit or some other unit such as a pump or a generator for example, and, for the purposes of cooperation thereof with the machine and vehicle components, precise positioning and/or accommodation of high forces relative to the first housing part is necessary.

Thus, the problem is that the functional attachment unit can only be mounted on the second housing part if its structural stiffness is sufficient to hold the functional attachment unit in a stable position over a long period of time.

Consequently, the object of the invention is to improve a machine and vehicle component of the type described hereinabove in such a way that it is producible from economical components and so that functional attachment units can be mounted in the region of the second housing part.

SUMMARY OF THE INVENTION

In accordance with the invention, this object is achieved in the case of a machine or vehicle component of the type described hereinabove in that the second housing part is formed from a thermoplastic material of low structural rigidity and in that there is provided a carrier having a carrying element consisting of a structurally rigid material which is fixed relative to the first housing part and upon which the attachment unit is held by means of the mounting element.

The advantage of the solution in accordance with the invention is to be seen in that, due to the provision of the carrying element and the mounting element, the forces for holding the attachment unit on a part of structurally rigid material, namely, the carrier with the carrying element, can be transferred so that the second housing part consisting of material of low structural rigidity is not subjected to the forces for holding the attachment unit.

In regard to the connection between the carrying element and the mounting element, provision is made in particular for the carrying element to carry the mounting element without transferring forces via the second housing part so that no forces whatsoever for fixing the attachment unit relative to the carrier have to be transferred via the second housing part and thus too, no forces have to be accommodated thereby.

It is particularly expedient thereby, if the carrying element comprises a contact surface on which the mounting element is supported by a mounting surface, in particular, by means of a mounting surface without an intermediate element such as an additional seal for example being located therebetween.

This solution creates the possibility of accurately positioning the attachment unit relative to the carrier and thus relative to the first housing part.

In order to additionally achieve advantageous sealing in the region of the opening of the second housing part, provision is made for the second housing part to comprise a sealing collar consisting of the thermoplastic material of low structural rigidity which encloses the opening and is sealed relative to the mounting element or to the carrying element independently of the forces for holding the attachment unit.

Due to the fact that the sealing between the sealing collar of the second housing part and the mounting element and the carrying element is likewise effected independently of the forces for holding the attachment unit, the load on the sealing collar consisting of the thermoplastic material of low structural rigidity can be selected in such a way that it does not lead to creepage of the thermoplastic material of low structural rigidity in the region of the sealing collar.

In principle thereby, it would be conceivable for the plastic material to be formed in such a way that it can be placed tightly against either the mounting element or the carrying element.

Another possibility would be to utilise an adhesive connection between the sealing collar and the mounting element or the carrying element.

A particularly expedient solution envisages that the sealing collar be sealed relative to the mounting element or the carrying element by means of a seal consisting of a resilient material.

A seal consisting of resilient material of this type makes it possible in a simple manner to reduce the forces that are effective thereon for the purposes of sealing the sealing collar in such a way that no creepage or a sub-critical creepage of the material of the sealing collar consisting of thermoplastic material of low structural rigidity takes place.

A particularly expedient solution envisages that the sealing collar is sealed at least against the mounting element or the carrying element by a seal which is effective between a sealing side of the sealing collar and the mounting element or the carrying element and is thereby subjected to seal compression forces transverse to the plane of the sealing collar.

This solution has the advantage that the seal compression forces are effective towards the plane of the sealing collar so that it is then possible to introduce the seal compression forces via the sealing collar whereby they can be dimensioned such that the sealing collar consisting of the material of low structural rigidity exhibits no creepage or only a sub-critical amount of creepage.

A further advantageous solution envisages that the sealing collar be supported on a supporting side opposite the sealing side, i.e. that in this regard, the sealing collar experiences support for accommodating the seal compression forces.

In particular thereby, the support of the sealing collar on the side opposite the sealing side also contributes to the prevention of creepage or the reduction thereof to a subcritical value.

This support could for example be effected by an element which is connected to the mounting element or the carrying element, relative to which the sealing collar is sealed by the seal.

However, a particularly expedient solution envisages that the sealing collar be supported on the supporting side by the carrying element or the supporting element, i.e. by the element, relative to which the sealing collar is not sealed by means of the seal.

A particularly expedient solution envisages thereby that the sealing collar be held in a defined predetermined position relative to the mounting element or the carrying element, relative to which sealing is effected by means of the seal.

Such a defined predetermined position of the sealing collar relative to the mounting element or the carrying element can be achieved in a simple manner by holding the sealing collar in the defined predetermined position by a stop element which is effective between the sealing collar and the mounting element or the carrying element.

In particular, provision is made for the seal to be resiliently deformed by the defined position of the sealing collar and the mounting element or the carrying element relative to each other and thus for the seal compression forces which are effective between the sealing flange and the seal as well as between the seal and the mounting element or the carrying element to result from this resilient deformation of the seal.

In connection therewith, provision is expediently made for the seal to be subjected to seal compression forces which are dimensioned such that the seal abuts the sealing collar and the mounting element or the carrying element such as to provide effective sealing.

In connection therewith, the seal compression forces are dimensioned such that the sealing collar does not experience a deformation due to creepage of the thermoplastic material of low structural rigidity.

In order to ensure that the seal compression forces are due only to the deformation of the resilient seal and that no greater forces are effective on the sealing collar, provision is preferably made for the seal to bridge a gap between the sealing collar and the mounting element or the carrying element and for it to abut both in sealing manner, whereby, due to the gap, it is ensured that the sealing collar does not abut directly on the mounting element or the carrying element and hence that no greater seal compression forces act on the sealing collar than those which are due to the resilient deformation of the sealing element.

In order to achieve fixing of the sealing collar relative to the mounting element or the carrying element in a simple manner, provision is advantageously made for the carrying element and the mounting element to form a sealing collar seating for the sealing collar.

This means that the sealing collar seating is bounded by both the mounting element and the carrying element so that the sealing collar can then be inserted into the sealing collar seating in a simple manner, if the mounting element has not yet been placed on the carrying element.

Due to the placement of the mounting element on the carrying element, the sealing collar can thereby be fixed in the sealing collar seating in such a way that the sealing collar can no longer be moved out of the sealing collar seating.

In particular, the sealing collar seating is formed in such a way that it comprises a first and a second seating surface, and that the sealing collar abuts one of the seating surfaces by means of a contact side.

A construction of this type makes it possible to support the sealing collar on the seating in a simple manner.

Furthermore, provision is preferably made for the seal to be effective between the sealing collar, especially a sealing side thereof, and the other seating surface, and in particular, to be arranged between the sealing collar and the other seating surface, whence seal compression forces arise which result from the fact that the sealing collar on the one hand and the other seating surface on the other are effective on the seal and the latter is clamped therebetween.

In connection with the exemplary embodiments described up to now, no details have been given in regard to the arrangement of the seal.

Thus, one advantageous solution envisages that the sealing collar be provided with a seal seating for the seal.

Due to a seal seating of this type, the seal can be positioned accurately on the one hand and the seal can be prevented from becoming distorted and thus adopting unanticipated shapes of seal which would impair the sealing effect on the other.

As an alternative to the provision of a seal seating in the sealing collar, another solution envisages that the mounting element be provided with a seal seating for the sealing collar.

Another alternative solution envisages that the carrying element be provided with a seal seating for the seal.

In particular in the case of a variably shaped seal, provision is preferably made for the seal seating in a seal surface to define a contour for the variably shaped seal, the variably shaped seal cannot then change its shape in the seal plane and thus impair the sealing effect.

In this case for example, the seal seating is in the form of a recess into which a variably shaped seal is insertable so that the contour of the variably shaped seal is predefined by the contour of the recess.

In connection therewith, for example a variably shaped seal is to be understood as a ring of elastomer material, an O-ring in the simplest case, the contour of which can be preset in the seal surface by the seal seating in the form of a recess.

As an alternative to the provision of a seal seating, another advantageous solution envisages that the seal lie freely between a first or a second collar surface and one of the seating surfaces.

In this case, it is expedient if the seal is in the form of a seal of fixed shape.

An example of a fixed shape seal of this type envisages that the seal comprise at least one seal body consisting of a resilient material and a seal carrier of fixed shape.

The seal carrier defines the shape and thus the contour of the seal body so that no seal seating for defining the contour of the seal in the seal surface is necessary.

Further features and advantages of the invention form the subject matter of the following description and the graphical illustration of some exemplary embodiments.

DETAILED DESCRIPTION OF THE INVENTION

Figure 1:
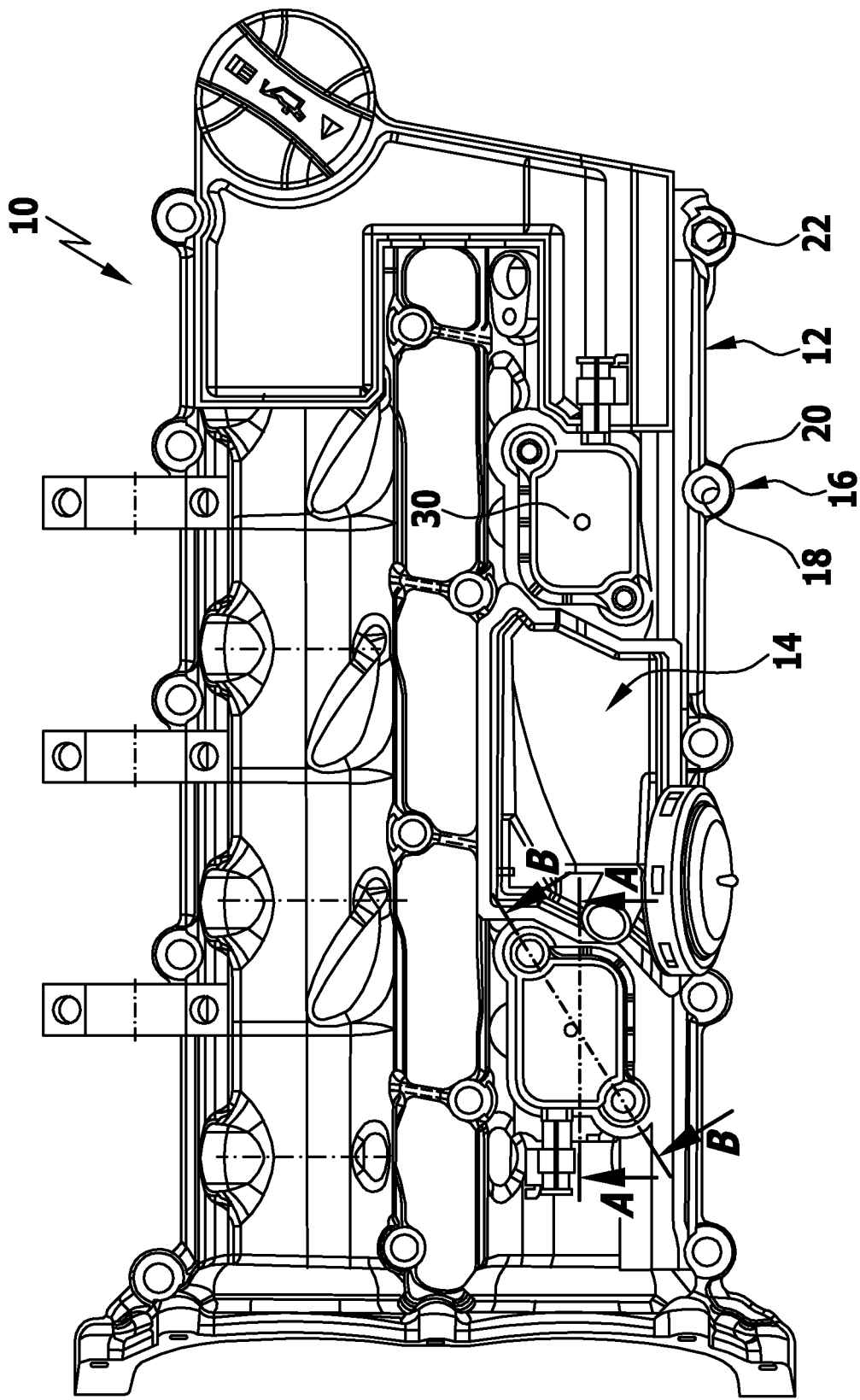
FIG. 1 shows a view of a machine or vehicle component in accordance with the invention, in this case of an internal combustion engine.

An exemplary embodiment of a vehicle component in accordance with the invention such as an internal combustion engine 10 of a motor vehicle is illustrated in FIG. 1 and it comprises an engine block which incorporates a first housing part 12. As illustrated in FIG. 1, this first housing part 12 is covered by a second housing part 14 which in this case is in the form of a hood wherein the hood is preferably made of a material of very low structural rigidity such as a fibre-filled thermoplastic material for example, whereas the engine block comprising the first housing part 12 is usually made of a structurally rigid material such as metal for example.

The first housing part 12 and the second housing part are connected together by bolted connections 16, wherein each bolted connection 16 comprises a screw eye 18 in the second housing part 14 and a corresponding screw eye 20 that is not shown in FIG. 1 in the first housing part 12, a bolt 22 being threaded into these eyes so that the screw eyes 18 and 20 are connectable together and adapted to be placed on each other for the production of the bolted connection 16.

The problem of bolting the second housing part 14 to the first housing part 12 is that the second housing part 14 made of material of very low structural rigidity may not be subjected to very large forces in the region of the bolted connections 16 because the screw eyes 18 in the thermoplastic material of very low structural rigidity have a tendency to creep under high torque forces on the bolted connections 16 i.e. the force to which the two screw eyes 18 and 20 are subjectable in a direction towards one another must lie below a force threshold for the creepage of the material of the screw eyes 18.

For this reason, the bolted connections 16 have to be designed in such a way that they do not produce contact forces that are caused by high torques and which lead to creepage of the fibre-filled thermoplastic material.

Thereby, creepage of the fibre-filled thermoplastic material is to be understood as a change of shape which occurs in the course of time when a component is subjected to a constant force and thus changes the dimensions of the component, wherein the ensuing changes of dimensions with reference to the starting dimension amount to at least 0.5 percent, and usually lie within the single-digit percentage range at least.

In the case of the internal combustion engine 10 in particular, the hood 14 represents a valve cover which tightly closes the interior space 24 occupied by the valves together with the engine block with respect to the surrounding environment.

Figure 2:
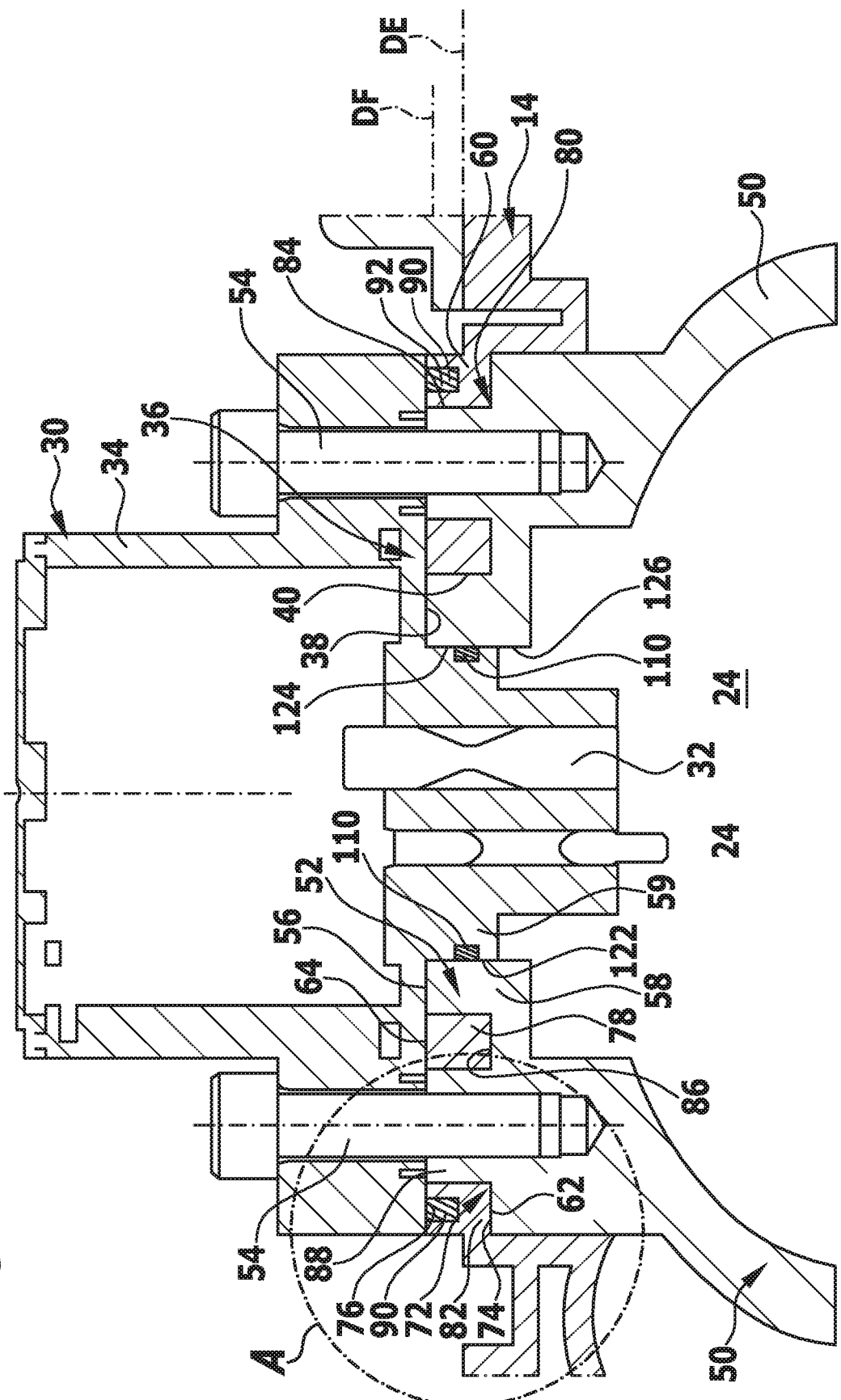
FIG. 2 a section along the line 2-2 in FIG. 1 through a first exemplary embodiment of the machine or vehicle component in accordance with the invention.
Figure 3:
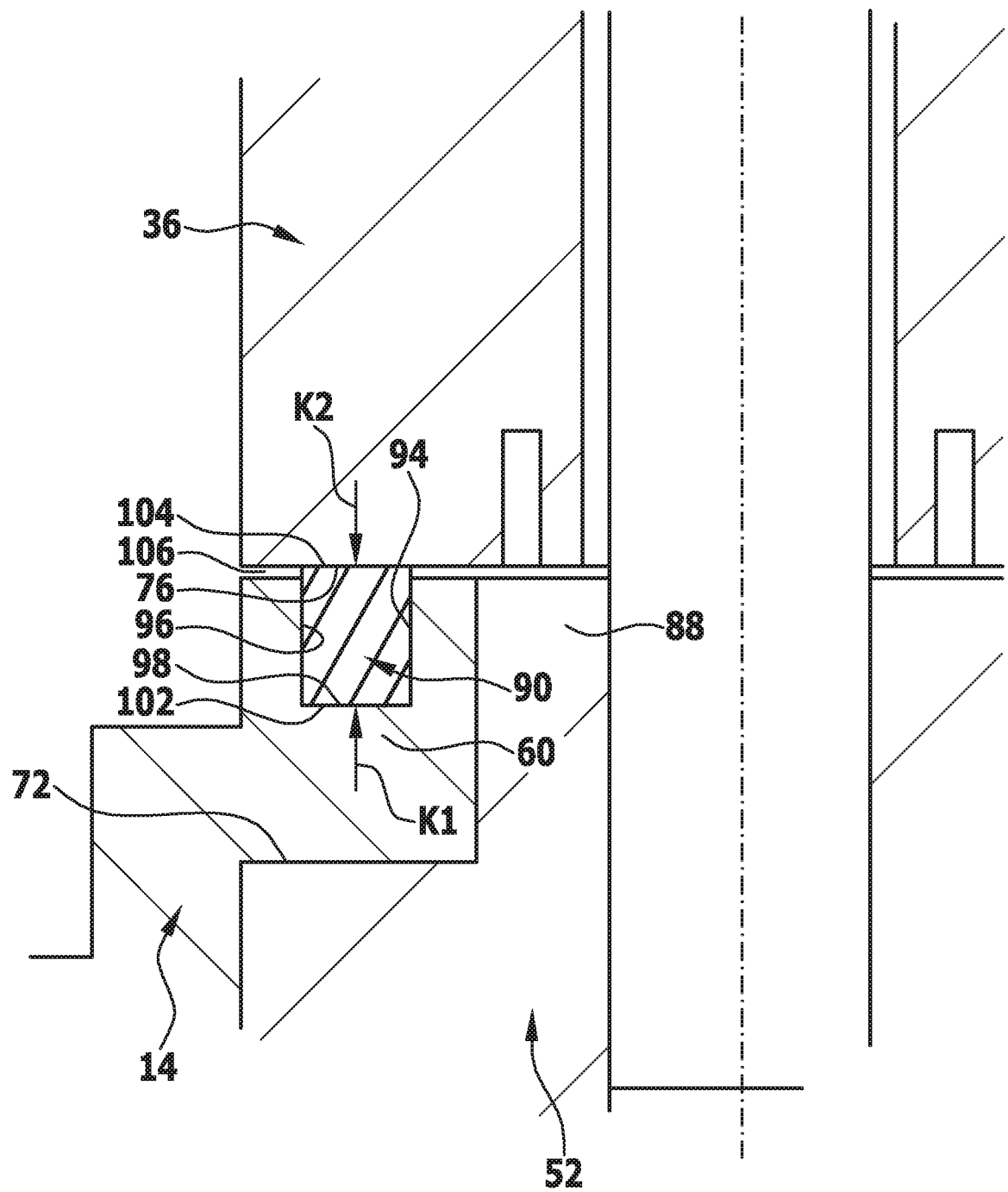
FIG. 3 an enlarged illustration of the region A in FIG. 2.

In order to enable the valve timings for example to be adjusted, there are provided attachment units 30 in the form of adjusting units which, as in a first exemplary embodiment that is illustrated in FIG. 2, have a functional part 32 which extends through an opening 40 in the second housing part 14 in order to affect functions of the machine or vehicle component, in this case, the control times of the valves.

Due to the very low structural rigidity of the second housing part 14 made of thermoplastic material, the functional attachment units 30 in the form of adjusting units do not sit on the second housing part 14 and be carried thereby, but rather, they are seated on a carrier 50 which is fixed relative to the first housing part 12 and is arranged to be supported thereby and comprises a carrying element 52 upon which a housing 34 of the adjusting unit 30 is directly mounted by means of a mounting element 36.

In connection therewith, at least the mounting element 36 of the adjusting unit 30 is formed from a structurally rigid material and in the same way, the carrying element 52 and the carrier 50 are formed from a structurally rigid material so that the mounting element 36 and the carrying element 52 are supported relative to each other in a structurally rigid manner and thereby, they are connected to one another and subjected to force by bolts 54 for example.

Thus the adjusting units 30 are precisely positioned relative to the first housing part 12, i.e. to the engine block, in a stable and lasting manner in order to enable a functional effect that is to be performed by the adjusting units 30 on the machine or vehicle component, the internal combustion engine in this case, to be ensured in a reliable manner.

For this reason for example, the carrying element 52 is provided with a bearing surface 56 on which the mounting surface 38 of the mounting element 36 abuts so that the mounting element 36 is directly supported on the carrying element 52.

Preferably, the carrying element 52 is provided with a carrying ring 58, which extends through the extension 59 of the mounting element 36 of the adjusting unit 30 that accommodates the functional part 32 and abuts on the carrying ring 58.

In order to enable a tight closure to the second housing part 14 to be produced in the region of the carrying element 52 and the mounting element 36, the second housing part 14 is provided with a sealing collar 60 consisting of fibre-reinforced thermoplastic material which is arranged around the opening 40 in the second housing part 14 and encloses it.

The sealing collar 60 comprises a first collar surface 62 and a second collar surface 64 which are arranged on mutually opposite sides of a plane DE of the sealing collar in which the sealing collar 60 lies.

In connection therewith, the sealing collar 60 preferably lies in a sealing collar seating 72 which is formed by the carrying element 52 and the mounting element 36 and comprises a first seating surface 74 which faces the first collar surface 62 and is arranged on the carrying element 52 for example, and also a second seating surface 76 which is located opposite the first seating surface 74 and faces the second collar surface 64 and is arranged on the mounting element 36.

In the simplest case, the sealing collar seating 72 comprises a step-like groove 80 in the carrying element 52, said groove comprising a groove base 82 forming the first seating surface 74 and also a groove wall 84 which runs transversely relative to the groove base 82 and thus too, transverse with respect to the first seating surface 74 and the second seating surface 76.

In the case where the groove 80 is arranged exclusively in the carrying element 52, the second seating surface 76 formed by the mounting element 36 lies in the same plane as the mounting surface 38 for example.

In the first exemplary embodiment illustrated in FIG. 2, it could be sufficient to form the sealing collar seating 72 in such a way as to accommodate the sealing collar 60 which surrounds the opening 40. In the illustrated exemplary embodiment, the sealing collar 60 is provided in the region of the bolts 54 with a retaining eye 78 which, for example, is located in a recess 86 of the carrying ring 58 surrounding the respective bolt 54 and encompass a collet 88 of the carrying element 52 that accommodates the bolt 54, wherein the collet 88 extends up to the mounting surface 38 and forms a part of the surface of the bearing surface 56.

The bearing surface 56 and the mounting surface 38 thus form stop elements which define the spacing of the first seating surface 74 and the second seating surface 76 relative to each other.

For the purposes of sealing between the second housing part 14 in the region of the sealing collar 60 and the mounting element 36, there is provided a seal 90 of variable shape which, for the purposes of fixing the contour thereof in a seal surface DF, is located in a seal seating 92 which is provided in the sealing collar 60 and surrounds the opening 40 and is in the form of a groove that is open towards the second collar surface 64 of the sealing collar 60 for example and comprises an inner side wall 94 and also an outer side wall 96 which rise above a base 98 of the groove, wherein the base 98 is arranged to face the second seating surface 76.

The seal 90 located in the seal seating 92 projects above the second collar surface 64 of the sealing collar 60 which represents a sealing side, whilst the first collar surface 74 abutting on the first seating surface 74 forms the supporting side of the sealing collar 60.

Thus, the seal 90 abuts on the second seating surface 76 by means of a first seal contact surface 102 of the seal 90, whereas the seal 90 abuts the base 98 of the seal seating 92 by means of a second seal contact surface 104 so that the seal 90 extends between the first seal contact surface 102 of the mounting element 36 and the second seal contact surface 104 of the carrying element 52 and thereby experiences a line-like compression by virtue of the seal compression forces K1 and K2 which are respectively oriented transversely with respect to the plane of the sealing collar DE and perpendicularly with respect to the seal contact surfaces 102 and 104 and are lower than the force causing creepage of the material of the sealing collar 60.

Preferably, in the installed state thereof between the first seal contact surface 102 and the second seal contact surface 104, the seal 90 is resiliently distorted to such an extent that this deformation produces the seal compression forces K1 and K2 directed transversely to the seal contact surfaces 102 and 104 due to the self-elasticity thereof. A gap 106 remains between the second collar surface 64 and the second seating surface 76 since the spacing of the first seal contact surface 102 and the second seal contact surface 104 from each other is preset by the position of the mounting surface 38 of the mounting element 36 and the position of the seating surface 56 of the carrying element 52 which function as stop elements and define the spacing of the second seating surface 76 from the first seating surface 74, wherein this spacing is greater than the spacing of the collar surfaces 62 and 64 from each other.

This thus makes it possible for the seal 90 to produce a sealed closure between the first seal contact surface 102 of the second housing part 14 on the one hand and the mounting element 36 on the other and thus too, the housing 34 of the adjusting unit 30, without the collar surfaces 62 and 64 of the sealing collar 60 itself being clamped between the seating surfaces 74 and 76 and subjected to large forces.

Since the carrier 50, which is fixed relative to the first housing part 12, is overlapped by the second housing part 14, a sealant between the carrier 50 and the second housing part 14 is not absolutely necessary as long as a sealed closure between the second housing part 14, the sealing collar 60 of the second housing part 14 in this case, and the mounting element 36 of the adjusting unit 30 is effected.

For security however, yet another seal 110 is preferably provided between the carrying ring 58 of the carrying element 52 and the extension 59 accommodating the functional part 32, wherein, in this case, the extension 59 is provided with a cylindrical guidance surface 122 and this cylindrical guidance surface 122 comprises a recess 124 for accommodating the seal 110.

The seal 110 thus additionally produces a sealed closure between a cylinder surface 126 of the carrying ring 58 accommodating the cylindrical guidance surface 122.

Figure 4:
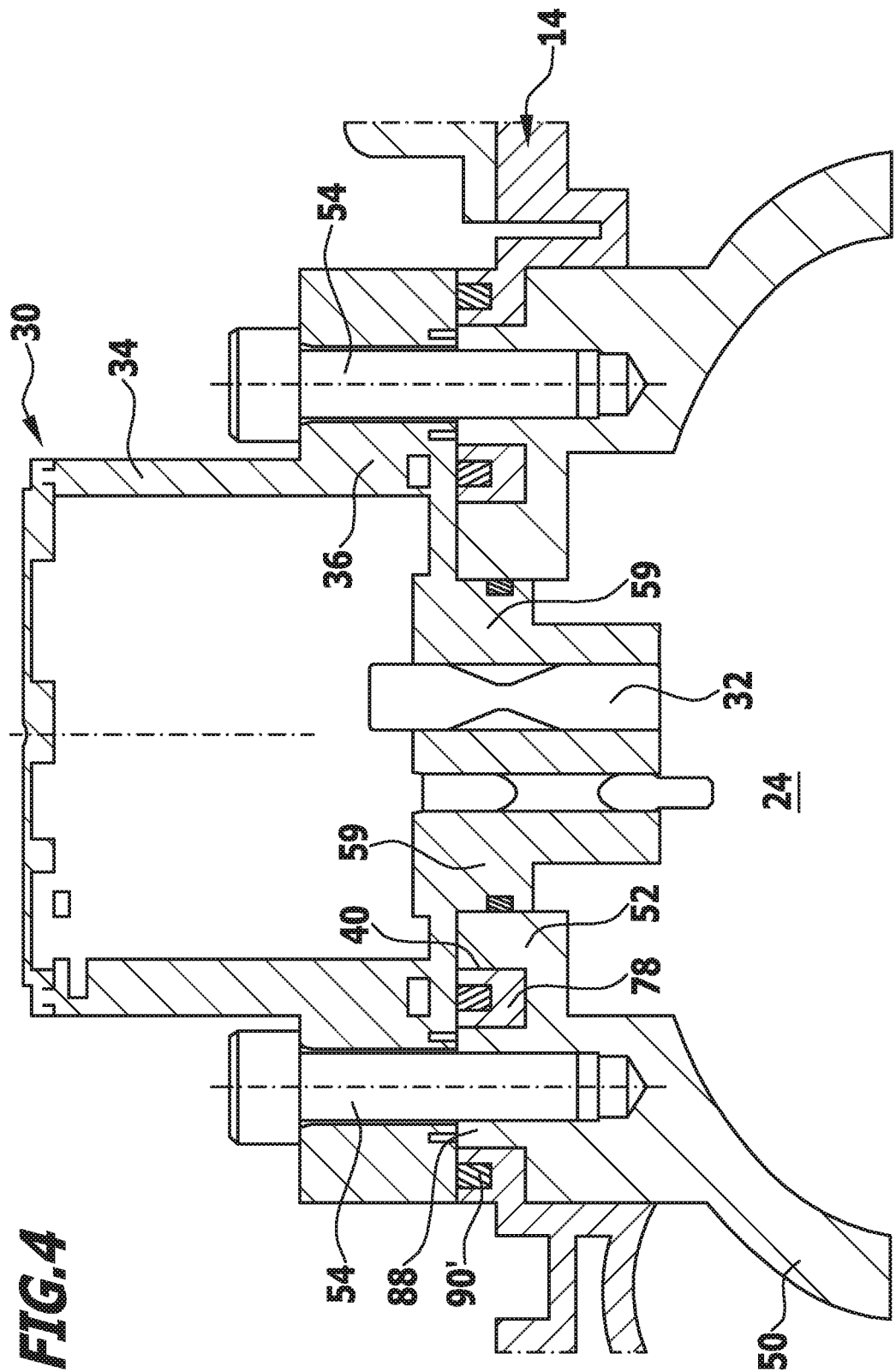
FIG. 4 a section similar to FIG. 2 through a second exemplary embodiment of the machine or vehicle component in accordance with the invention.

In a second exemplary embodiment which is illustrated in FIG. 4, the seal seating 92' is formed in such a way that it encloses the collet 88 in the retaining eye 78 as well so that as a result the seal 90' does not just run around the opening 40 but around the respective bolt 54 and in particular too, the collet 88 in the retaining eye 78 as well.

In this exemplary embodiment, the sealing in the region of the retaining eye 78 is thus improved still more.

In all other respects, those elements of the second exemplary embodiment which are identical to those of the first exemplary embodiment are provided with the same reference symbols so that reference can be made to the full contents of the remarks relating to the first exemplary embodiment.

Figure 5:
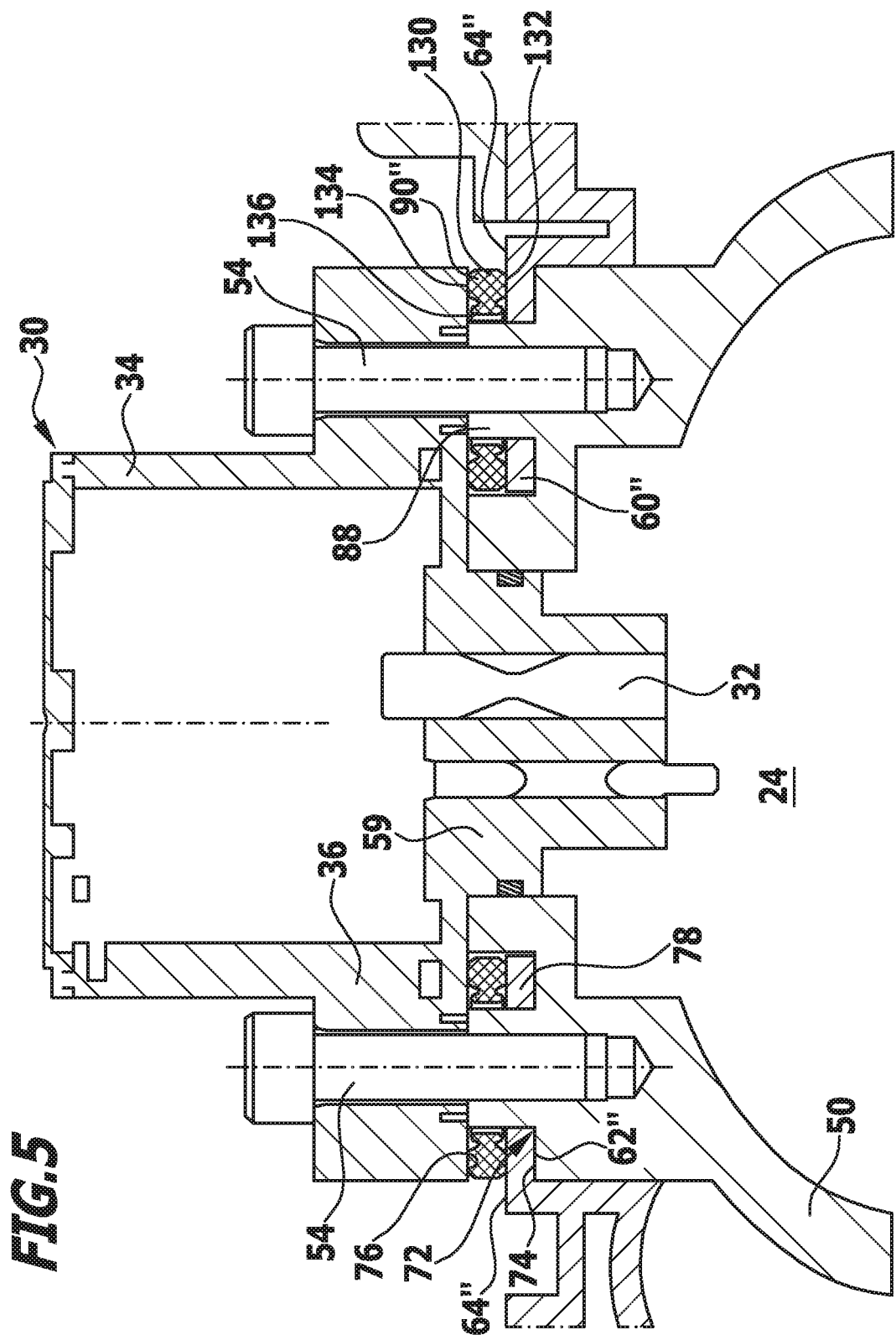
FIG. 5 a section similar to FIG. 2 through a third exemplary embodiment of a machine or vehicle component in accordance with the invention.

In a third exemplary embodiment which is illustrated in FIG. 5, the sealing collar 60" is not provided with a seal seating but rather, is formed in such a way that its first collar surface 62" still abuts the first seating surface 74 of the sealing collar seating 72 as before, whereas a second collar surface 64" is located at a spacing from the second seating surface 74 which is arranged on the mounting element 36.

In this case, the fixed-shape seal 90" which comprises a resilient seal body 130 consisting of a resilient material for example lies between the second collar surface 74 and the second seating surface 76, a first seal contact surface 132 of said seal body abutting the second collar surface 64" in sealing manner and a second seal contact surface 134 thereof abutting the second seating surface 76 in sealing manner.

For the purposes of stabilizing the variably shaped resilient seal body 130, there is provided a seal carrier 136 which is arranged between the second collar surface 64" and the second seating surface 76 beside the seal body 130 and is formed from a structurally rigid profiled material which is firmly connected to the seal body 130 by lateral clamping thereof.

As an alternative thereto, it is also conceivable for the seal carrier 136 to have a plate-like shape and be coated on both sides with a respective seal body.

In the third exemplary embodiment furthermore, provision is likewise made for the seal body 130, in the region of the retaining eye 78, to abut thereon and to run around the respective bolt 54 and in particular too, the respective collet 88.

In all other respects, the third exemplary embodiment is constructed in the same way as the preceding exemplary embodiments so that reference can be made to the full contents of the remarks relating to the preceding exemplary embodiments.

Figure 6:
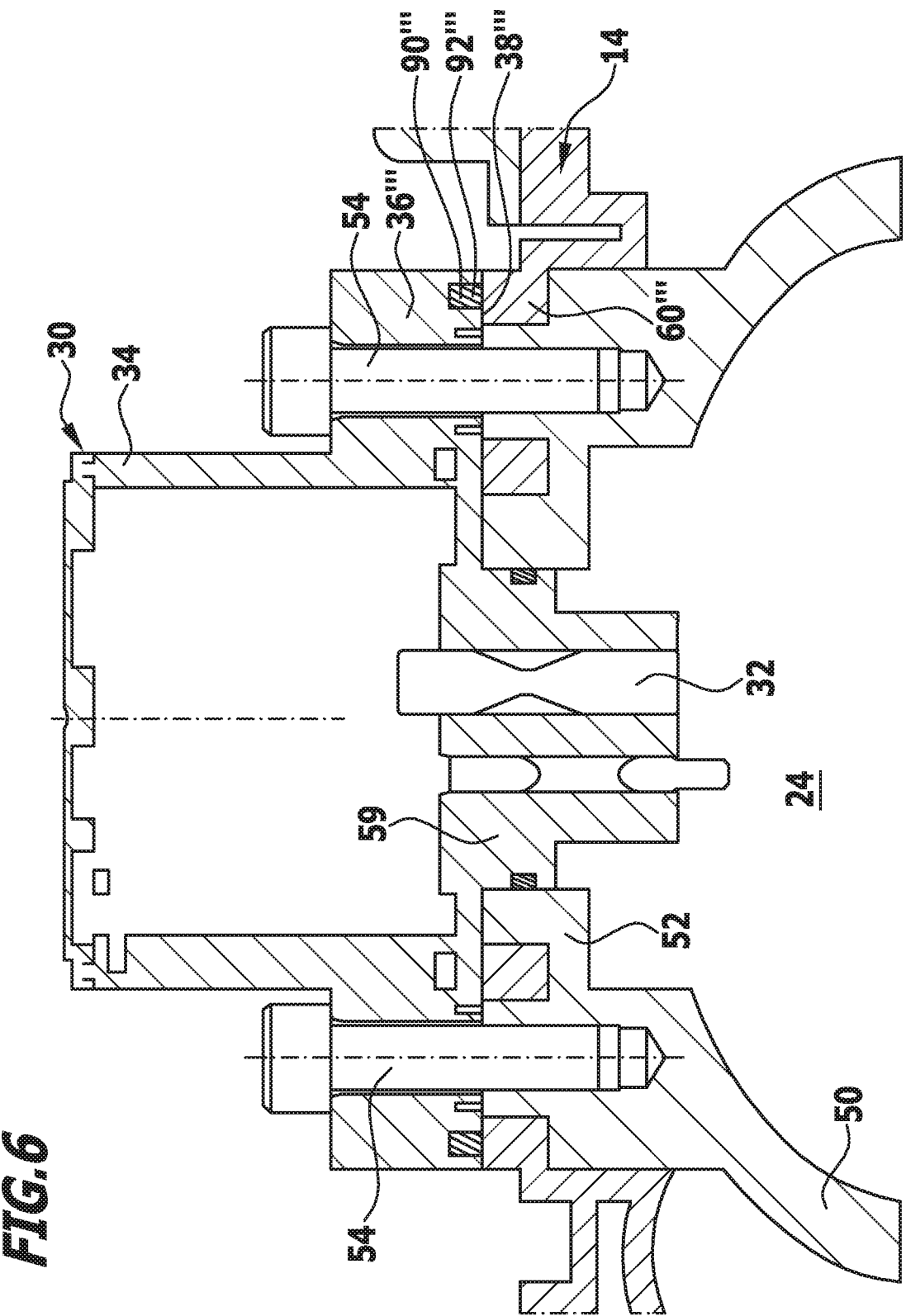
FIG. 6 a section similar to FIG. 2 through a fourth exemplary embodiment of a machine or vehicle component in accordance with the invention.

In a fourth exemplary embodiment which is illustrated in FIG. 6, the sealing is effected with the variably shaped seal 90''' in the same way as for the first exemplary embodiment, namely, in like manner between the mounting element 36 and the sealing collar 60, wherein in this case, the seal 90''' lies in a seal seating 92''' which is not provided in the sealing collar 60''', but rather, in the mounting element 36''' and is thereby open towards the mounting surface 38'''.

In all other respects, the sealing in the fourth exemplary embodiment is effected in accord with the same principles as were described in connection with the first exemplary embodiment so that in regard to the seal seating 92''' and the seal 90''' and also the functioning thereof reference can be made to the full contents of the remarks relating to the first exemplary embodiment.

Figure 7:
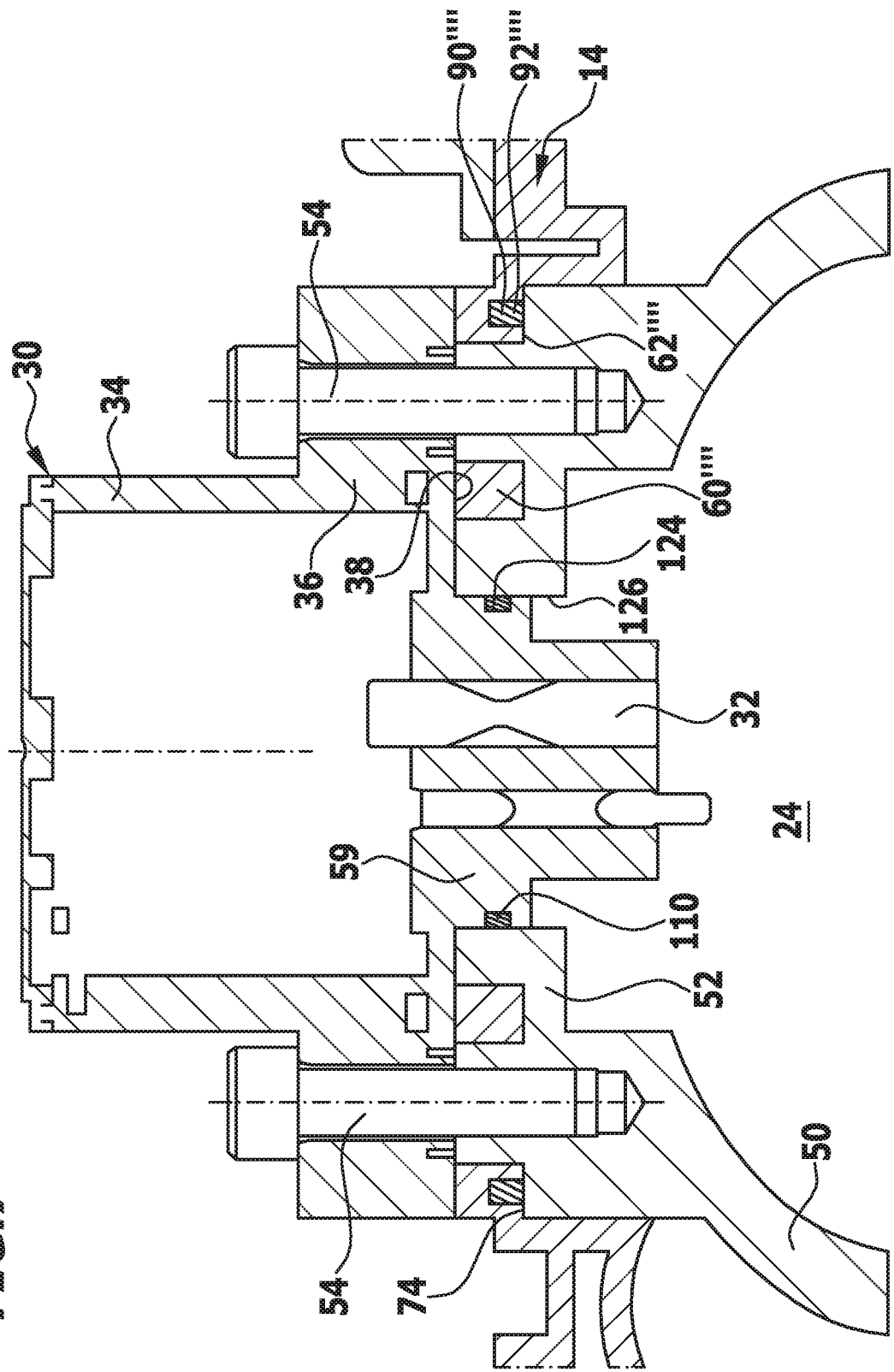
FIG. 7 a section similar to FIG. 2 through a fifth exemplary embodiment of a machine or vehicle component in accordance with the invention.

In a fifth exemplary embodiment which is illustrated in FIG. 7, the sealing collar 60'''' is provided with a seal seating 92'''' which is open towards the first collar surface 62'''' of the sealing collar 60'''' so that the seal 90'''' arranged in this seal seating 92'''' is effective to produce sealing between the sealing collar 60'''' and the carrying element 52, in particular, the seating surface 74.

Hereby, the seal 90'''' can be formed in the same way as for the first and fourth exemplary embodiment and the seal seating 92'''' is also formed in a corresponding manner.

However, the sealed closure between the sealing collar 60'''' and the carrying element 52 has the consequence that reliable sealing is no longer present between the sealing collar 60'''' and the mounting element 36, in particular the mounting surface 38 thereof.

For this reason, it is imperative that provision be made in this exemplary embodiment for the seal 110 to effect sealing between the functional part 32 of the adjusting unit 30 and the carrying element 52, in particular sealing between the seating 124 and the cylindrical surface 126 as was described in connection with the first exemplary embodiment.

Thus, in this exemplary embodiment, the interior space 24 between the first housing part 12 and the second housing part 14 is sealed on the one hand by the seal 110 between the extension 59 of the mounting element 36 of the adjusting unit 30 and by the seal 90'''' between the sealing collar 60'''' of the second housing part 14 and the carrying element 52 on the other.

In all other respects as regards those parts which are identical to those of the preceding exemplary embodiments and are provided with the same reference symbols, reference is made to the full contents of the remarks relating to the preceding exemplary embodiments, and in particular too, to the first exemplary embodiment.

Figure 8:
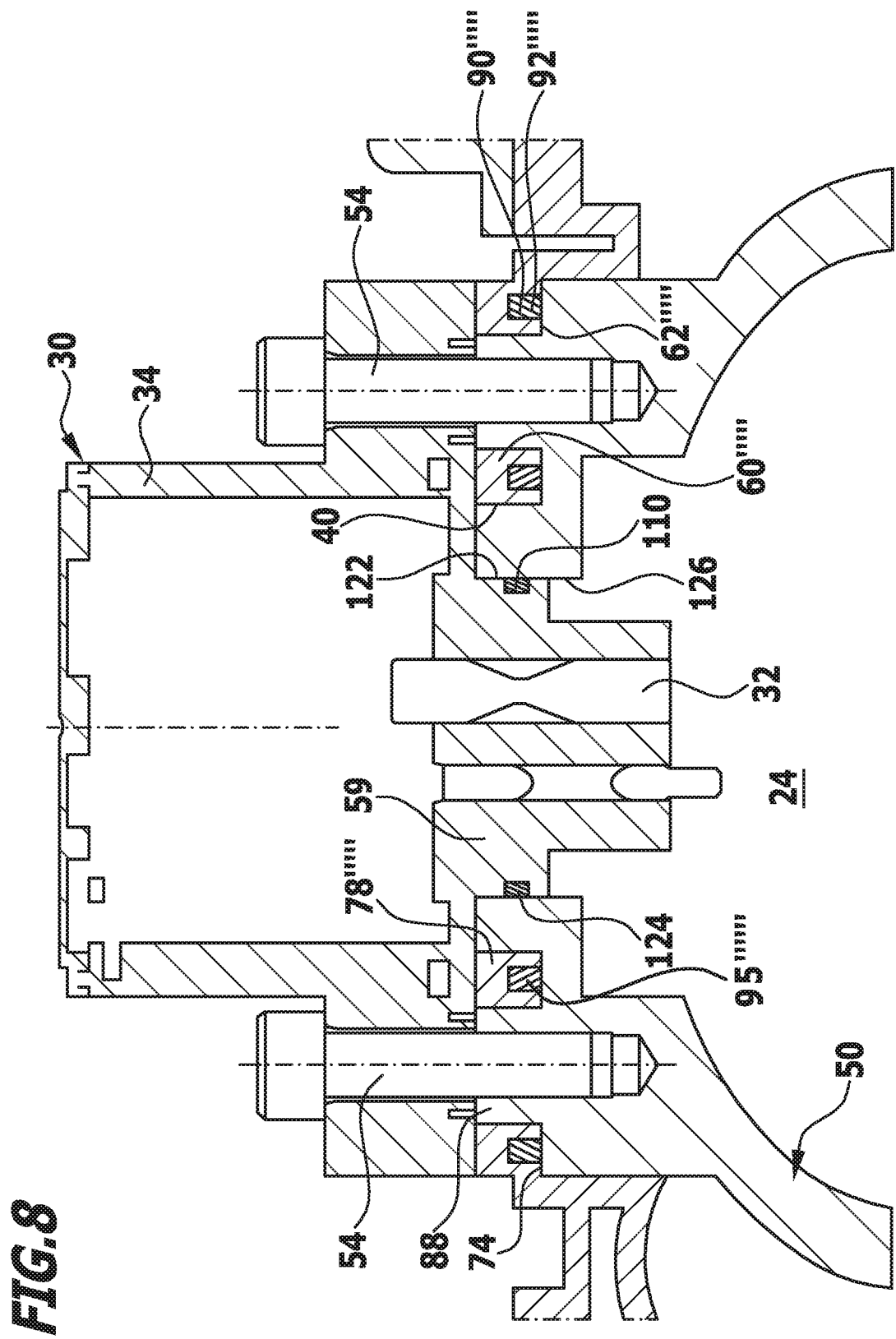
FIG. 8 a section similar to FIG. 2 through a sixth exemplary embodiment of a machine or vehicle component in accordance with the invention.

In a sixth exemplary embodiment of a machine or vehicle component in accordance with the invention which is illustrated in FIG. 8, the variably shaped seal 95''''' runs not only outwardly around the opening 40 of the sealing collar 60''''', but in addition, around the respective bolt 54 and in particular too, the collet 88 in the region of the retaining eyes 78'''''.

In all other respects, the seal seating 92''''' is formed in a similar manner to that of the second exemplary embodiment but with the difference that it is open towards the first collar surface 62''''' and effects sealing with the first seating surface 74.

In all other respects, those parts which are identical to those of the preceding exemplary embodiments are provided with the same reference symbols so that in regard to the description thereof reference may be made to the full contents of the remarks in respect of the preceding exemplary embodiments.

Figure 9:
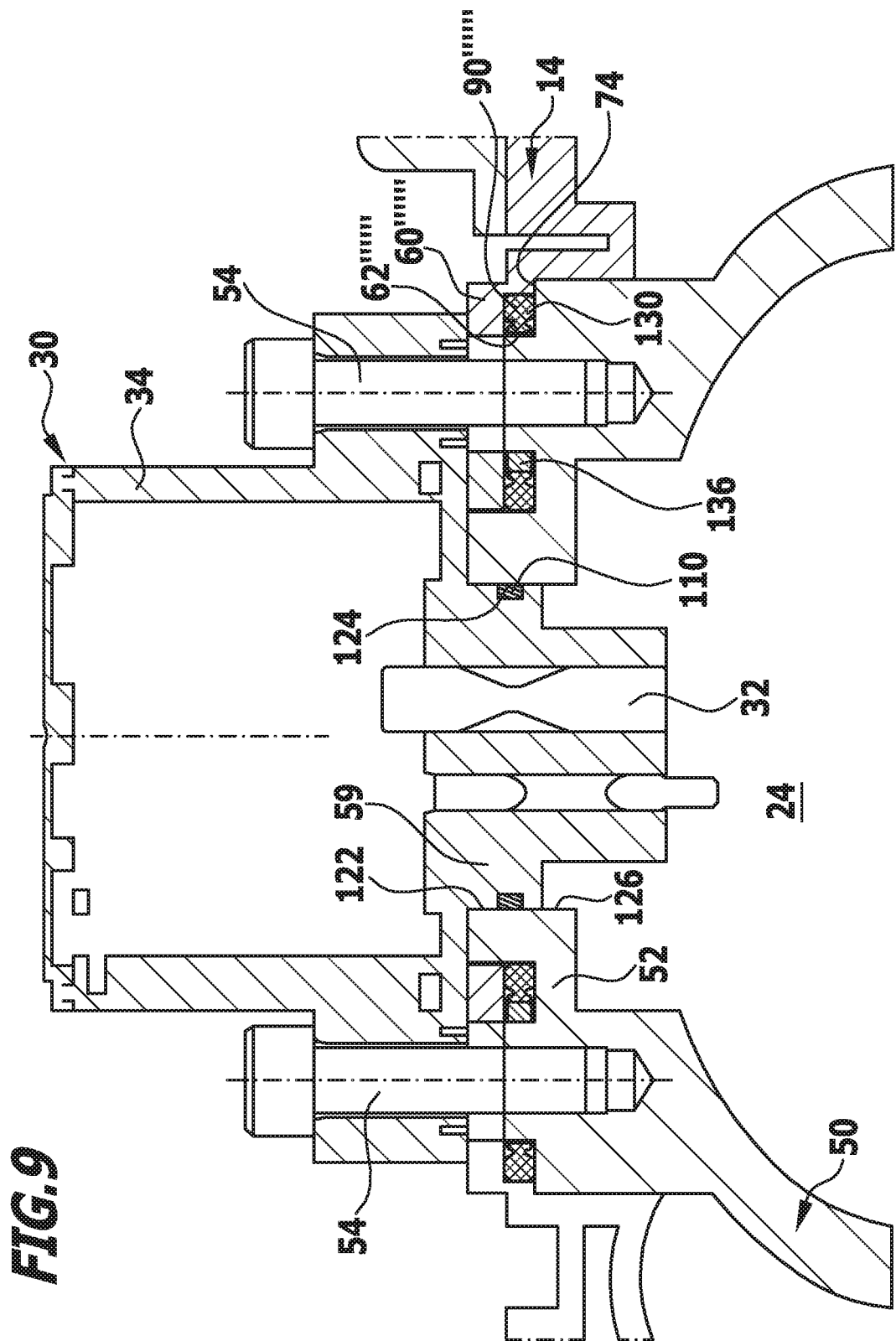
FIG. 9 a section similar to FIG. 2 through a seventh exemplary embodiment of a machine or vehicle component in accordance with the invention and FIG. 10 a section similar to FIG. 2 through an eighth exemplary embodiment of a machine or vehicle component in accordance with the invention.

In a seventh exemplary embodiment which is illustrated in FIG. 9, the sealing between the sealing collar 60'''''' and the carrying element 52 is effected by a fixed-shape seal 90'''''' which is constructed in a similar manner to the seal 90'' in accord with FIG. 5, i.e. it comprises a resilient seal body 130 which is held on a seal carrier 136

In this exemplary embodiment too, sealing between the first collar surface 62'''''' of the sealing collar and the first seating surface 74 of the carrying element 52 is now effected so that overall sealing between the second housing part 14 and the carrying element 52 occurs.

In all other respects in regard to the construction of the seal 90'''''' and the functioning thereof reference is made to the full contents of the remarks in respect of the third exemplary embodiment in accord with FIG. 5 and furthermore, all the parts of the seventh exemplary embodiment which are identical to those of the preceding exemplary embodiments are provided with the same reference symbols so that in regard to the description thereof reference may be made to the full contents of the remarks in respect of the preceding exemplary embodiments.

Figure 10:
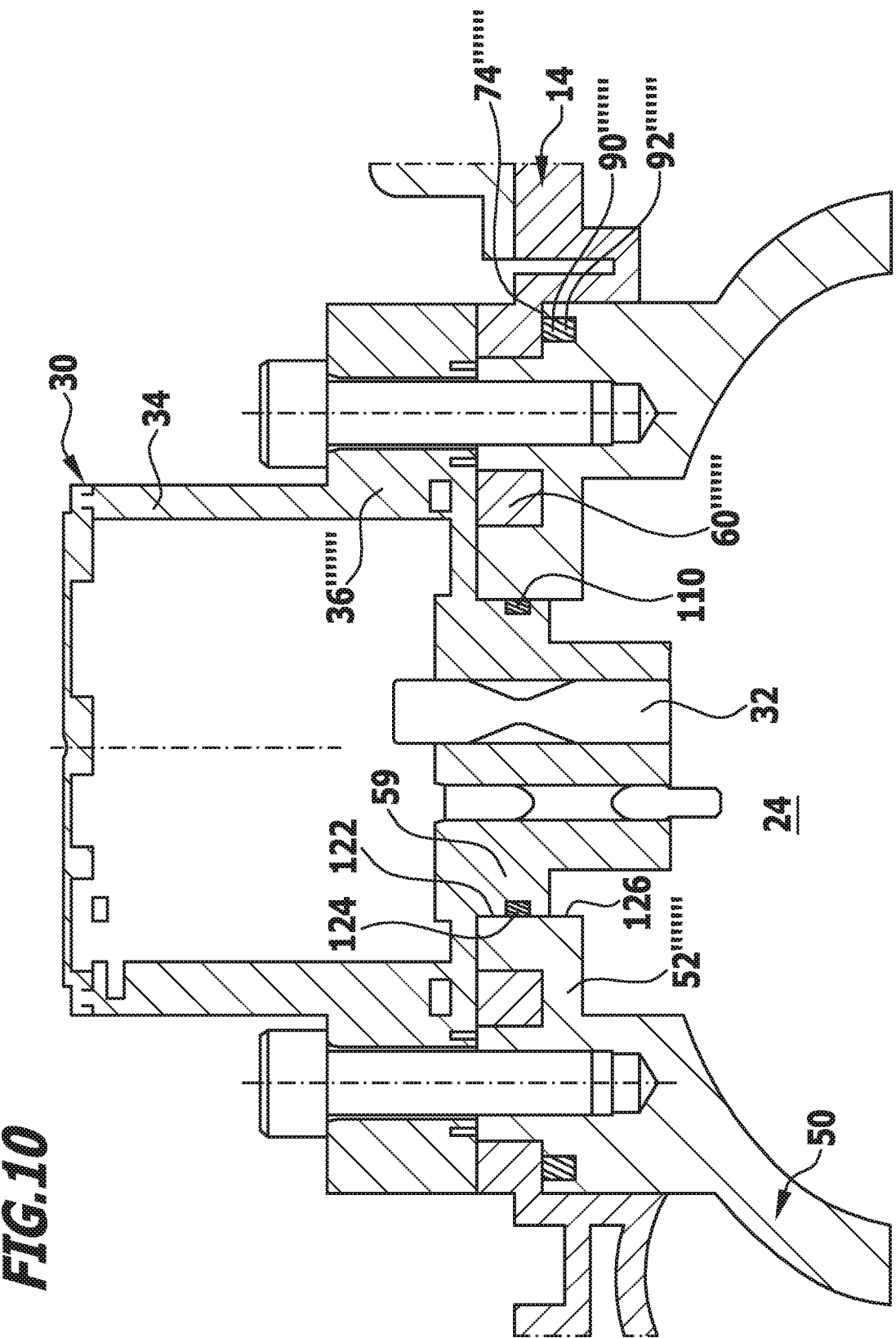

In an eighth exemplary embodiment which is illustrated in FIG. 10, the seal seating 92''''''' for accommodating the seal 90''''''' is formed in a similar manner to that of the fifth exemplary embodiment in accord with FIG. 7, but with the difference that the seal seating is arranged in the carrying element 52''''''' so that the seal seating 92''''''' is open towards the first seating surface 74''''''' and thus produces sealing between the sealing collar 60''''''' of the second housing part 14 and the carrying element 52.

In all other respects in regard to the further features of the eighth exemplary embodiment reference is made to the full contents of the remarks in respect of the preceding exemplary embodiments.

The invention claimed is:

1. A machine or vehicle component comprising
a first housing part made from a rigid material,
a second housing part covering the first housing part,
an opening which is provided in the second housing part,
a functional attachment unit cooperating with the machine or vehicle component by means of control and/or drive functions having a functional part which extends through the opening in the second housing part in order to affect functions of the machine or vehicle component, and further having a mounting element consisting of a structurally rigid material which extends through the opening in said second housing part and holds the functional part;
a carrier is provided which incorporates a carrying element consisting of a structurally rigid material and is directly attached to the first housing part and upon which the functional attachment unit is held by means of the mounting element, the carrying element and the mounting element being provided with stop elements abutting on each other for supporting the weight of the functional attachment unit such that mounting of the functional attachment unit to the carrier transfers no weight forces to the second housing part, the carrying element comprises a carrying ring, through which said mounting element with said functional part held therein extends, and further comprises a support surface on which the mounting element is supported by a mounting surface for receiving the forces for fixing the functional attachment unit on said carrying element, the second housing part is formed from a thermoplastic material and, the second housing part comprises a sealing collar consisting of the thermoplastic material which encloses the opening and is sealed relative to the mounting element or the carrying element without being subjected to the forces for supporting the functional attachment unit by the mounting element on said carrying element, the sealing collar is sealed at least against the mounting element or the carrying element by a seal which is effective between a sealing side of the sealing collar and the mounting element or the carrying element and is thereby subject to seal compression forces acting on the seal in a direction transversely relative to the plane in which the sealing collar extends;

the sealing collar is sealed relative to the mounting element or the carrying element by means of the seal consisting of resilient material, with seal compression forces introduced via the sealing collar, said seal compression forces being due to the deformation of the resilient seal provided by the seal bridging a gap between the sealing collar and the mounting element or the carrying element, and due to compressing of the seal when bridging the gap compression forces are dimensioned or limited such that the sealing collar, being made from a material of low structural rigidity relative to the carrying element, exhibits no creeping or a subcritical amount of creeping.

2. A machine or vehicle component in accordance with claim 1, wherein the sealing collar is supported on a supporting side opposite the sealing side.

3. A machine or vehicle component in accordance with claim 1, wherein the sealing collar is held in a defined predetermined position relative to the mounting element or the carrying element, relative to which sealing by means of the seal is effected.

4. A machine or vehicle component in accordance with claim 3, wherein the sealing collar is held in the defined predetermined position by the stop element which is effective between the sealing collar and the mounting element or the carrying element.

5. A machine or vehicle component in accordance with claim 3, wherein the seal is resiliently deformed by the defined position of the sealing collar and the mounting element or the carrying element relative to each other.

6. A machine or vehicle component in accordance with claim 1, wherein the seal bridges the gap between the sealing collar and the mounting element or the carrying element and abuts both in sealing manner.

7. A machine or vehicle component in accordance with claim 1, wherein the carrying element and the mounting element form a sealing collar seating for the sealing collar.

8. A machine or vehicle component in accordance with claim 7, wherein the sealing collar seating comprises a first seating surface and a second seating surface and in that the sealing collar abuts one of the seating surfaces.

9. A machine or vehicle component in accordance with claim 8, wherein the seal is effective between the sealing collar and one of the seating surfaces.

10. A machine or vehicle component in accordance with claim 7, wherein the seal lies freely between one of the collar surfaces and one of the seating surfaces.

11. A machine or vehicle component in accordance with claim 1, wherein the sealing collar is provided with a seal seating for the seal.

12. A machine or vehicle component in accordance with claim 1, wherein the mounting element is provided with a seal seating for the seal.

13. A machine or vehicle component in accordance with claim 1, wherein the carrying element is provided with a seal seating for the seal.

14. A machine or vehicle component in accordance with claim 1, wherein the seal is of variable shape, and in that the seal seating in a seal surface specifies a contour for the seal.

15. A machine or vehicle component in accordance with claim 1, wherein the seal is in the form of a seal of fixed shape.

16. A machine or vehicle component in accordance with claim 15, wherein the seal comprises at least one seal body consisting of a resilient material and a seal carrier of fixed shape.

* * * * *